No. 766,575. PATENTED AUG. 2, 1904.
L. F. ADT.
EYEGLASSES.
APPLICATION FILED NOV. 19, 1903.
NO MODEL.
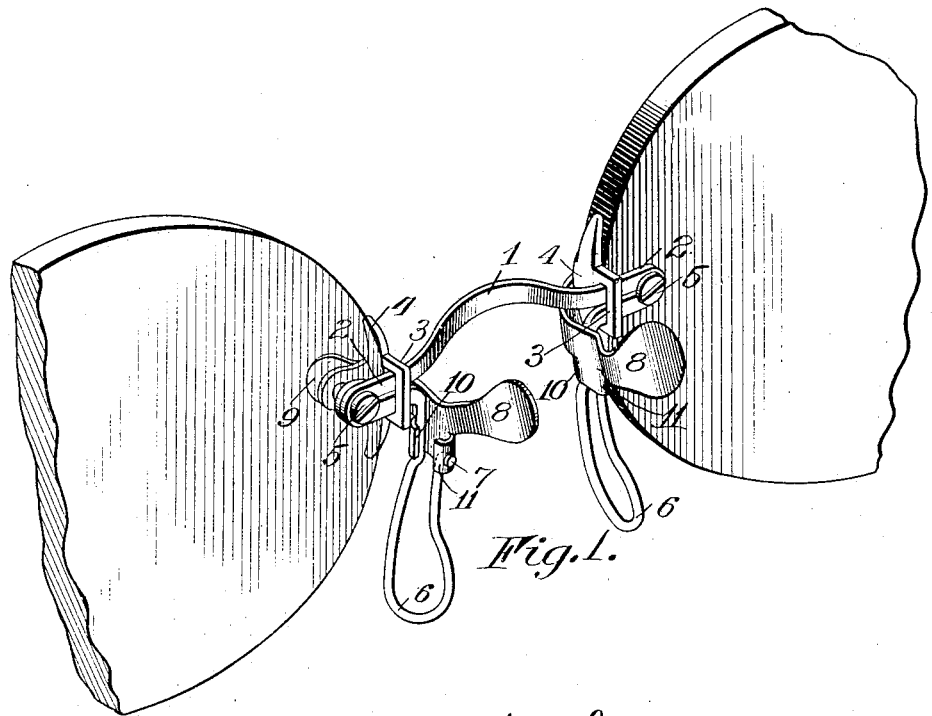
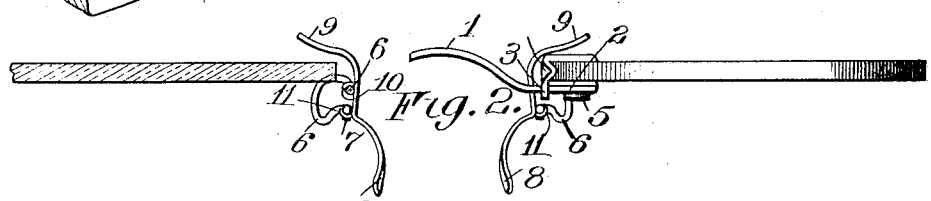
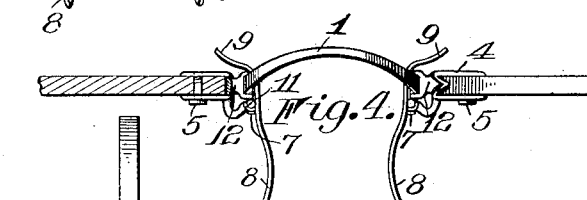
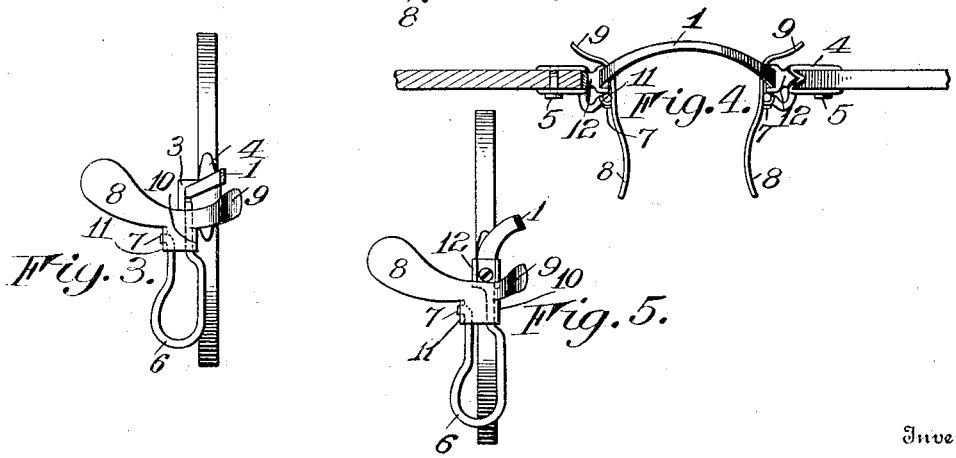
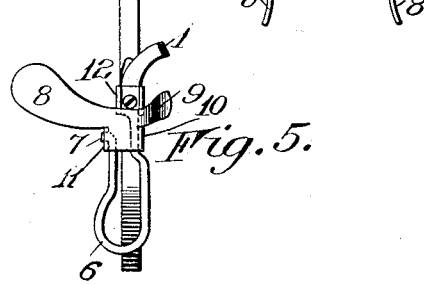
Witnesses: Walter B. Payne, Clarence A. Bateman
Inventor: Leo F. Adt
By Frederick S. Church
Attorney No. 766,575. Patented August 2, 1904.

UNITED STATES PATENT OFFICE.

LEO F. ADT, OF TROY, NEW YORK.

EYEGLASSES.

SPECIFICATION forming part of Letters Patent No. 766,575, dated August 2, 1904.

Application filed November 19, 1903. Serial No. 181,806. (No model.)

*To all whom it may concern:*

Be it known that I, LEO F. ADT, of Troy, in the county of Rensselaer and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to improvements in eyeglasses; and it has for its object to provide improved nose-guards for a device of this character having relatively fixed nose-engaging portions adapted to rest upon the sides of the wearer's nose to insure a firm and proper seating of the glasses thereon and adjustable portions movable relatively to the stationary portions and coöperating therewith to engage the nose to retain the glasses in position thereon with a minimum of pressure, suitable operating devices being provided by means of which the adjustable members may be readily released when it is desirable to remove the device from the nose.

To these and other ends my invention consists in certain features of novelty and advantage to be hereinafter more fully explained, and pointed out more particularly in the claims hereunto annexed.

In the drawings, Figure 1 is a perspective view of an eyeglass embodying my invention. Fig. 2 is a plan view thereof, partly in section. Fig. 3 is a view showing the nose-engaging portions in side elevation. Fig. 4 is a plan view showing another embodiment of my invention, and Fig. 5 is an end elevation of the same, showing one of the lenses removed.

In the views similar parts are designated by the same numerals of reference.

An eyeglass constructed in accordance with that form of my invention illustrated in Figs. 1 to 3, inclusive, embodies an arched bridge 1, preferably relatively inelastic and adapted, if desired, to rest upon the crest of the wearer's nose, the extremities of this bridge extending outwardly and thence doubling back to form the attaching ends 2 2, that extend through the apertured lugs 3 3 of the lens-clips 4 4 and receive fastening-screws 5 5, passing through the lenses and entering the clips to secure said bridge rigidly in position. The free ends of the bridge are thence extended downwardly, curved rearwardly, and finally doubled upwardly, forming the resilient loops 6 6, the extremities of the free arms of the loops terminating in the projections 7 7, the purpose of which will presently appear. The material forming the loops in the embodiment shown in Figs. 1 to 3 is integral with the bridge, and, if desirable, that portion thereof composing the loops may be reduced in comparative cross-section or otherwise formed or treated to render it pliable and to secure the requisite elasticity. Over the arms of each loop is fitted an adjustable nose-clamp having a nose-engaging portion 8 at one end and the operating projection 9 at the opposite end thereof, and intermediate between these portions is provided a bearing formed by the oppositely-disposed laterally-extending fingers 10 11, located approximately centrally of the clamp and preferably so curved as to embrace the arms of the loop, and between these fingers are sprung the resilient arms of the loop in such a manner that the projection 7 at the extremity of the rear loop-arm will enter an aperture in the adjacent finger 11 to retain the clamp in its proper position.

In fitting the glasses to the nose of each particular person the optician may readily bend the loops 6 6 into the proper curvature to properly bear upon the sides of the nose, and in order to give the adjustable nose-clamps the proper set in relation to the lower portion of the guard formed by the loops the arms of the latter may be bent, by means of pliers or other suitable instrument, in such a manner that the proper set will be given the adjustable portions, and as the elasticity of the loop-arms produces a force tending to proximate these adjustable portions the amount of this force may also be varied in the same manner to regulate the pressure of these nose-engaging portions on the wearer's nose.

In Figs. 4 and 5 is illustrated another form of eyeglass embodying my invention, wherein the bridge and nose-engaging portions are formed separately and attached to the lenses by the usual attaching-posts 12, such a construction being advantageous in simplifying and cheapening the process of manufacture and permitting bridges of different shapes or dimensions to be substituted and old guards to be replaced by new ones without rendering it necessary to discard the remainder of the mounting. In this embodiment of my invention the ends of the bridge and the guards are properly formed for attachment to the lens connections, and it will be understood that, if desired, a single screw-lens clip may be employed for attaching the bridge and guards to the lenses instead of the stud or post 12.

An eyeglass embodying my invention may be readily and accurately fitted to the nose of the wearer, as the relatively immovable or stationary guards or nose-engaging portions formed by the loops 6 6 are so shaped and arranged as to bear upon each side of the nose to insure a firm and proper seating of the glasses, and by employing the relatively movable nose-clamping portions at the upper portion of the guards to engage the nose in proximity to the inner corners of the eyes under the stress of the elastic arms of their respective loops it will be obvious that the holding power of the nose-guards will effectually maintain the glasses in position without unduly pinching the skin of the nose. These movable nose-clamps may be readily adjusted by manipulating the handles or projections 9 9 by the thumb and forefinger of the wearer's hand pressing them together, causing the nose-engaging portions 8 8 to separate and release their grasp upon the nose to permit the glasses to be removed, and when they are released they will move inwardly under the torsional action of the elastic loops 6 6, causing them to clamp the nose when the glasses are in position thereon. These movable nose-clamps may be readily removed when desired by pressing the arms of the loops together to such an extent as to disengage said arms from their corresponding fingers 10 and 11, thereby enabling the loop-arms to be freely bent into any desired position by the optician while fitting the glasses.

In an eyeglass of this character it is advantageous to employ a rigid or relatively inelastic bridge, as such a construction will enable the pupillary distance and other important relations between the lenses to be accurately preserved and maintained irrespective of the various adjustments of the glasses upon the wearer's nose; but it will be understood that various forms of bridges may be employed to meet the exigencies of various conditions.

I claim as my invention—

1. In eyeglasses, the combination with the lenses and a bridge connecting them, of a nose-guard for each lens having a relatively immovable lower portion adapted to rest against the wearer's nose, and a nose-clamp movably mounted at the upper portion of the guard and having operating projections for permitting it to be adjusted to the nose.

2. In eyeglasses, the combination with the lenses, and a bridge connecting them, of a pair of nose-guards attached to said lenses, each having a relatively immovable lower portion adapted to rest against the wearer's nose, and a relatively movable upper portion mounted pivotally in relation to the lower portion and having operating projections by means of which they may be adjusted.

3. The combination with the lenses of an eyeglass, and the bridge connecting them, of a pair of nose-guards for said lenses, each comprising a relatively fixed or immovable portion, and a relatively movable portion mounted in pivotal relation thereto having bearing portions arranged to engage the wearer's nose, and operating projections by means of which they may be adjusted.

4. The combination with the lenses of an eyeglass, and the bridge connecting them, of a pair of nose-guards each comprising a relatively elastic stationary portion, and a relatively movable member attached to said elastic portion and having a nose bearing portion arranged to move inwardly under the action of said elastic portion, and operating projections by means of which said movable members may be separated.

5. In eyeglasses, the combination with the lenses, and a bridge connecting them, of nose-guards having elastic loop portions arranged to rest against the wearer's nose, and relatively movable nose-engaging portions attached to said loop portions and normally tending to move inwardly under the elastic action of said loops, and operating projections carried by said movable portions by means of which they may be manipulated.

6. In eyeglasses, the combination with the lenses, and a relatively inelastic bridge connecting them, of nose-guards having relatively immovable elastic loops forming the lower portion thereof, relatively movable nose-engaging portions at the upper portion of said loops and engaging the arms thereof in such manner that the action of said loops tends to proximate said nose-engaging portions, and extensions carried by the latter forming handles by means of which they may be operated.

7. In eyeglasses, the combination with the lenses, and a bridge connecting them, of a pair of nose-guards each having a relatively elastic loop attached in fixed relation to the lenses and forming an enlarged surface adapted to rest against the wearer's nose, and a relatively movable member having a nose-engaging portion thereon, an operating projection by means of which said member may be manipulated, and a bearing portion intermediate of the nose-engaging portion and the operating projection engaging the arms of the loop in such a manner as to exert a torsional action on the latter when the nose-engaging portions are separated.

8. In eyeglasses, the combination with the lenses, and a bridge connecting them, of a pair of nose-guards each comprising a relatively elastic loop having an arm attached to the lens and having its other arm free, said loops forming nose bearing portions at the lower portion of the guards, and an adjustable member having bearing portions engaging the free and attached arms of each loop and arranged to move pivotally in relation to the relatively immovable lower portions of the guards, nose-engaging portions carried by the movable members and arranged to exert a pressure upon the nose under the elastic action of the loops, and operating projections by means of which said movable members may be adjusted.

9. In eyeglasses the combination with the lenses and bridge, of the guards therefor each embodying the downwardly-extending loop of resilient material adapted to engage the wearer's nose and the holding portion composed of the plates having the fingers engaging the upper extensions of the loop, the rearwardly-extending gripping portions and the forwardly-extending operating-arms.

10. The combination with the lenses of an eyeglass, and a bridge connecting them, of a pair of nose-guards each comprising a relatively elastic loop having one arm attached to the lens and its opposite arm free and terminating in a laterally-extending projection, said loops being shaped to conform to the curvature of the wearer's nose, and a relatively movable nose-engaging portion having open bearings thereon arranged to removably engage the arms of the loop and having an aperture to receive said projection to retain said movable portion in position, and operating projections for manipulating the adjustable nose-engaging portions.

11. The combination with the lenses of an eyeglass, of a bridge of relatively inelastic material connecting them, the ends of said bridge being bent downwardly and doubled upwardly to form relatively stationary elastic loops, and a relatively movable nose-engaging member having a bearing portion embracing the arms of said loops and arranged to move in pivotal relation thereto enabling the nose-engaging portions to be separated against the elastic action of said loop-arms, and operating projections by means of which said movable members may be adjusted.

LEO F. ADT.

Witnesses:
  CHARLES S. ALDRICH,
  EDWARD MURPHY, 2d.